(12) United States Patent
Wee et al.

(10) Patent No.: US 12,326,833 B2
(45) Date of Patent: *Jun. 10, 2025

(54) APPROACHES FOR MANAGING DATA RETENTION LIFECYCLE

(71) Applicant: Palantir Technologies Inc., Denver, CO (US)

(72) Inventors: Yeong Wei Wee, New York, NY (US); Leslie Bennett, Palo Alto, CA (US); Kevin Meurer, New York, NY (US); Matthew Sills, San Francisco, CA (US)

(73) Assignee: Palantir Technologies Inc., Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/439,691

(22) Filed: Feb. 12, 2024

(65) Prior Publication Data
US 2024/0264976 A1 Aug. 8, 2024

Related U.S. Application Data

(63) Continuation of application No. 17/235,858, filed on Apr. 20, 2021, now Pat. No. 11,899,619, which is a continuation of application No. 15/921,221, filed on Mar. 14, 2018, now Pat. No. 10,983,950.

(60) Provisional application No. 62/584,670, filed on Nov. 10, 2017.

(51) Int. Cl.
*G06F 16/11* (2019.01)
*G06F 16/16* (2019.01)

(52) U.S. Cl.
CPC .......... *G06F 16/125* (2019.01); *G06F 16/122* (2019.01); *G06F 16/162* (2019.01)

(58) Field of Classification Search
CPC ..... G06F 16/125; G06F 16/122; G06F 16/162
USPC ....................................................... 707/663
See application file for complete search history.

(56) References Cited

U.S. PATENT DOCUMENTS

| | | |
|---|---|---|
| 6,460,055 B1 | 10/2002 | Midgley et al. |
| 7,483,915 B2 | 1/2009 | Thompson et al. |
| 7,739,316 B2 | 6/2010 | Thompson et al. |
| 7,831,563 B2 | 11/2010 | Brown et al. |
| 7,996,028 B2 | 8/2011 | Vargas et al. |
| 8,131,739 B2 | 3/2012 | Wu et al. |
| 8,555,247 B2 | 10/2013 | Keller |
| 8,560,794 B2 | 10/2013 | Resch et al. |

(Continued)

OTHER PUBLICATIONS

Non-Final Office Action dated Jun. 8, 2023, issued in related U.S. Appl. No. 17/235,858 (27 pages).

(Continued)

*Primary Examiner* — Shahid A Alam
(74) *Attorney, Agent, or Firm* — Sheppard Mullin Richter & Hampton LLP

(57) ABSTRACT

Systems and methods are provided for determining a set of objects, the objects corresponding to a given case or application of a deletion/retention policy; determining at least one object in the set of objects to be scheduled for deletion, the at least one object being associated with a given state that specifies a deletion and/or retention type and schedule for the at least one object; and scheduling data corresponding to the at least one object for deletion from one or more data sources based at least in part on the deletion and/or retention type and schedule specified in the object state.

20 Claims, 8 Drawing Sheets

(56) References Cited

U.S. PATENT DOCUMENTS

| | | |
|---|---|---|
| 9,052,942 B1 | 6/2015 | Barber et al. |
| 9,063,946 B1 | 6/2015 | Barber et al. |
| 9,417,917 B1 | 8/2016 | Barber et al. |
| 2006/0053334 A1 | 3/2006 | Ingen et al. |
| 2010/0306176 A1 | 12/2010 | Johnson et al. |
| 2011/0225361 A1* | 9/2011 | Resch .................. G06F 16/162 |
| | | 707/638 |
| 2011/0276539 A1 | 11/2011 | Thiam |
| 2015/0142748 A1 | 5/2015 | Gottemukkula |

OTHER PUBLICATIONS

Notice of Allowance mailed Oct. 11, 2023, issued in related U.S. Appl. No. 17/235,858 (11 pages).

Extended European Search Report dated Jan. 9, 2019, issued in related European Patent Application No. 18205539.2 (8 pages).

Examination Report dated Dec. 7, 2020, issued in related European Patent Application No. 18205539.2 (5 pages).

Examination Report dated Nov. 16, 2022, issued in related European Patent Application No. 18205539.2 (7 pages).

* cited by examiner

APPROACHES FOR MANAGING DATA RETENTION LIFECYCLE

CROSS REFERENCE TO RELATED APPLICATIONS

This application is a continuation of U.S. application Ser. No. 17/235,858, filed Apr. 20, 2021, which is a continuation of U.S. application Ser. No. 15/921,221, filed Mar. 14, 2018, now U.S. Pat. No. 10,983,950, which claims the benefit under 35 U.S.C. § 119(e) of U.S. Provisional Application No. 62/584,670, filed Nov. 10, 2017, the contents of which are incorporated by reference in their entirety into the present disclosure.

FIELD OF THE INVENTION

This disclosure relates to approaches for managing data retention lifecycle.

BACKGROUND

Under conventional approaches, various types of data can be stored and represented using an object model. An object model may be made up of a number of objects that serve as containers for data and the type of relationships between them. Each object can include a number of object components and descriptors.

SUMMARY

Various embodiments of the present disclosure can include systems, methods, and non-transitory computer readable media configured to determine a set of objects, the objects corresponding to a given case or application of a deletion/retention policy; determine at least one object in the set of objects to be scheduled for deletion, the at least one object being associated with a given state that specifies a deletion and/or retention type and schedule for the at least one object; and schedule data corresponding to the at least one object for deletion from one or more data sources based at least in part on the deletion and/or retention type and schedule specified in the object state.

In some embodiments, the systems, methods, and non-transitory computer readable media are configured to determine that deletion or application of a retention policy of the at least one object is needed to satisfy one or more data retention configurations.

In some embodiments, the systems, methods, and non-transitory computer readable media are configured to generate metadata related to a retention policy of the at least one object.

In some embodiments, the object type, property, and/or metadata specifies that the at least one object is to be made inaccessible to end users or only accessible to a smaller subset of users than it was previously.

In some embodiments, the object type, property, and/or metadata specifies that data corresponding to the at least one object is to be deleted from one or more corresponding data sources.

In some embodiments, the systems, methods, and non-transitory computer readable media are configured to provide an interface that includes a list of objects among the set of objects that are scheduled for deletion, the list of objects including the at least one object and/or associated metadata.

In some embodiments, the interface includes a set of options for modifying respective states of objects included in the list, such as approving or unapproving such objects for deletion.

In some embodiments, the set of options includes an option for modifying a deletion schedule for a given object.

In some embodiments, the option for modifying a deletion schedule for the object requires inputting a justification for the modification that may or may not be logged for the purposes of oversight.

In some embodiments, the systems, methods, and non-transitory computer readable media are configured to send one or more notifications of the scheduled deletion for the at least one object to one or more administrators.

In some embodiments, the systems, methods, and non-transitory computer readable media are configured to delete data corresponding to the at least one object from one or more data sources based at least in part on the deletion type, property and/or metadata and schedule specified in the object state.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
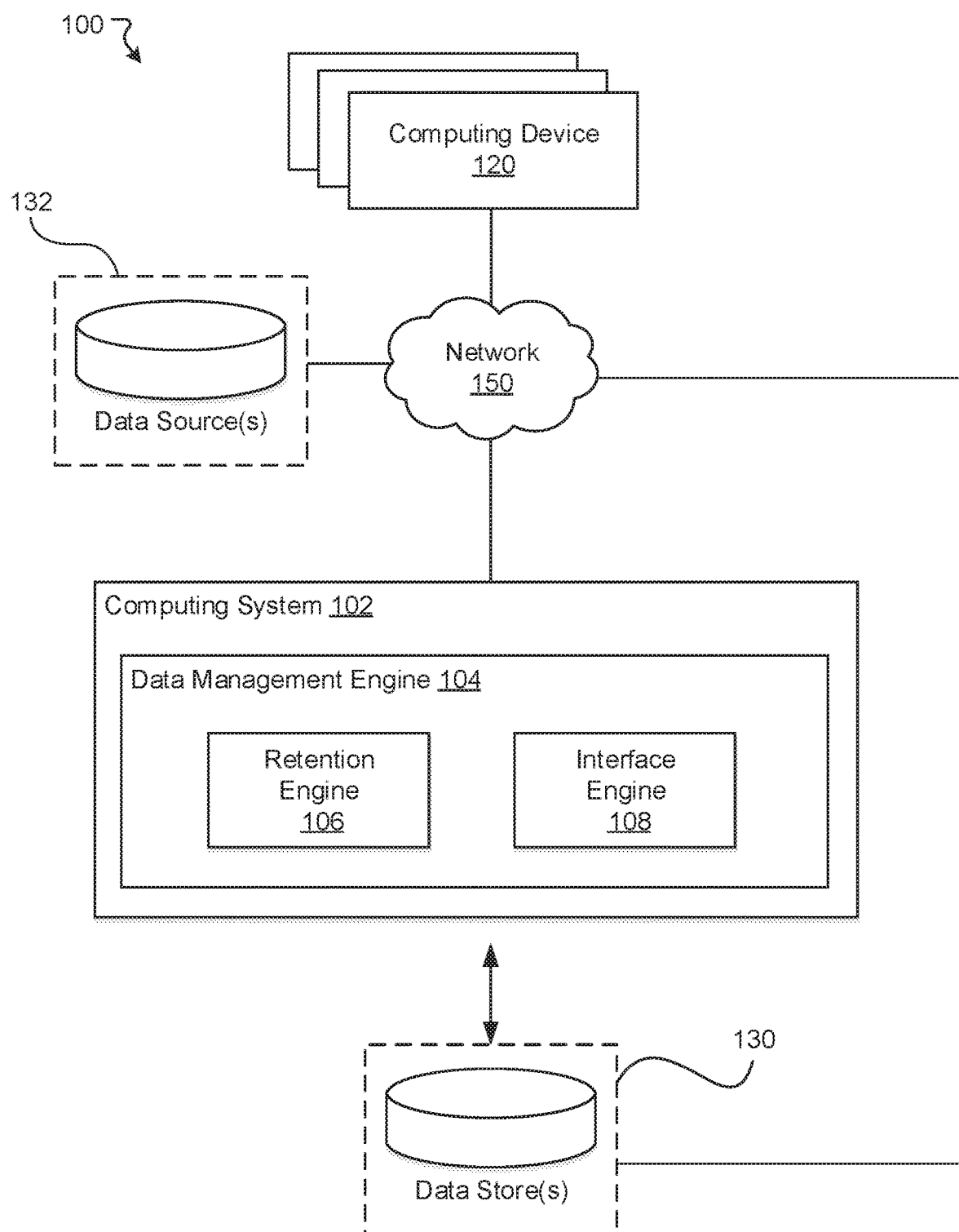
FIG. 1 illustrates an example computing environment, in accordance with various embodiments.

Under conventional approaches, various types of data can be stored and represented using an object model. The objects created based on the object model may include a number of objects that serve as containers for data. Each object can include a number of object components. The data represented by such objects may itself reside on various data sources (e.g., federated data sources, conventional databases, etc.). In some instances, conventional approaches for managing objects and data represented by those objects may be inadequate. For example, conventional approaches may not be sufficient to implement data retention policies that manage the retention of both objects and data represented by those objects.

A claimed solution rooted in computer technology overcomes problems specifically arising in the realm of computer technology. In various embodiments, a system can be configured to manage object data (e.g., objects in an object graph, data represented by those objects, or both). In some embodiments, such objects can represent data stored in one or more data sources (e.g., federated data sources, conventional databases, etc.). In one example, a data source may correspond to a database that includes a table in which data has been populated based on some schema. In this example, a set of objects may be created to represent the data stored in the table. For example, each object may reference a corresponding row in the table. In some embodiments, each object can be associated with various components (e.g., properties) as defined by an object model (or ontology). These object components can reference various information that relates to a given object.

For example, in some embodiments, a set of objects may represent data stored on one or more data sources. When managing this object data, the system can determine a respective state for each of the objects. The state of a given object can indicate whether the object is scheduled for some retention action. The state may also describe the type of action. In some embodiments, this state can be determined in view of various compliance or regulatory policies. For example, a data compliance policy may refer to a custom data retention policy as defined by an organization or authorized curator. In some instances, the data compliance policy may be a data retention policy promulgated by some governing authority, such as a state or federal government.

In various embodiments, object states can be determined and recomputed periodically. In some embodiments, information describing object states can be stored in one or more data stores. For example, in some embodiments, object states can be determined for all objects in a given database. These object states and related metadata can be stored in data stores. Subsequently, these object states can be recomputed periodically (e.g., hourly, daily, etc.) for all objects in the database that were created, deleted, or modified and these recomputed states can be stored in the data stores. Many variations are possible.

Once object states are determined, the system can provide information describing these states through an interface (e.g., a graphical user interface or an application programming interface). For example, the information can include a list of objects that are scheduled for deletion, respective object states, projects (or cases) to which the objects correspond, purge dates for the objects, and legal expiration dates for the objects, to name some examples. In some embodiments, the information also includes metadata to help users more quickly reach a decision of how to manage objects. For example, the system may highlight objects of certain object types that the user uses in considering whether to unschedule those objects from scheduled deletion and/or retention. In another example, the system may highlight objects with certain properties and/or metadata that the user uses in considering whether to unschedule those objects from scheduled deletion and/or retention. An authorized administrator accessing the interface can approve deletion of object data corresponding to objects scheduled for deletion and/or modify object states as desired. For example, the administrator can approve deletion of the object via a graphical user interface (e.g., a soft delete), deletion of data represented by the object from its corresponding data sources (e.g., a hard delete), or both. In another example, the administrator can modify a state of an object so that corresponding object data is no longer scheduled for deletion. In some embodiments, the administrator is required to provide a justification (legal or otherwise) for modifying an object state. In some embodiments, objects corresponding to a given project can also be visualized through the interface. This object view allows the administrator to selectively modify object states and/or deletion schedules of object data. For example, the administrator can flag an object for deletion, modify an existing deletion timeframe for an object, or preserve an object from deletion.

In some embodiments, an action service running on the system can implement deletions of object data based on their states. For example, the action service can soft or hard delete object data. In some embodiments, the action service can send notifications of imminent or upcoming object deletions to a designated administrator. In some embodiments, the action service can reclassify objects scheduled for deletion based on changes to their respective states. In some embodiments, the action service can enforce object states even after the objects have been deleted. For example, the action service can determine when a deleted object (or data represented by a deleted object) is restored from backup. In this example, the action service can enforce deletion of the previously deleted object (or data represented by the deleted object) based on the object's last known state. That is, the corresponding object data can again be deleted (e.g., soft deleted, hard deleted, or both) by the action service despite its restoration from backup. For example, in some embodiments, such operations can be performed by rerunning the bootstrap job, which recomputes the retention policies which would apply to restored objects. In some embodiments, the data retention framework state may be restored from the same backup and, in those instances, upon restoration, the data retention framework can immediately be run to apply the appropriate retention strategies to keep the system is compliant. In some embodiments, for systems with backup and restore requirements, the data retention framework stores a history of objects that have been successfully actioned upon. In such embodiments, the data retention framework is immediately rerun against these objects to compute the appropriate retention strategy. In general, the approaches described herein can be adapted to any type of environment in which data is managed. For example, the approaches can be adapted to manage data accessible through federated data sources. In some embodiments, a delete call can be send to a federated data source to delete data corresponding to a given object.

FIG. 1 illustrates an example environment 100, in accordance with various embodiments. The example environment 100 can include at least one computing system 102 that includes one or more processors and memory. The processors can be configured to perform various operations by interpreting machine-readable instructions. In some embodiments, the example environment 100 may be implemented as an enterprise data platform. In some embodiments, the example environment 100 may be configured to interact with computing systems of an enterprise data platform. In various embodiments, computing systems of the enterprise data platform may store and manage various data as objects. In some embodiments, a number of objects serve as containers for data. There can also be various relationships between objects, for example, using edges (or links) that connect objects. Each object can include a number of object components including, for example, a properties component that includes structured pieces of information, a media component that includes binary attachments of data (e.g., text documents, images, videos, etc.), a notes component (e.g., a free text container), and one or more respective links (or edges) that associate the object with other objects. In some instances, there can be different types of objects. For example, an object may represent an entity (e.g., person(s), place(s), thing(s), etc.), an activity (e.g., event, incident, etc.), a document, or multimedia, to name some examples. In some embodiments, objects can be associated with properties (or states) that can be used to manage retention of those objects and/or data represented by those objects in one or more data sources 132. These data sources may include federated data stores, databases, or any other type of data source from which data can be ingested and represented as objects, for example. In some embodiments, data corresponding to populated objects is stored and accessible through one or more data stores 130.

In some embodiments, the computing system 102 can include a data management engine 104. The data management engine 104 can include a retention engine 106 and an interface engine 108. The data management engine 104 can be executed by the processor(s) of the computing system 102 to perform various operations including those operations described in reference to the retention engine 106 and the interface engine 108. In general, the data management engine 104 can be implemented, in whole or in part, as software that is capable of running on one or more computing devices or systems. In one example, the data management engine 104 may be implemented as or within a software application running on one or more computing devices (e.g., user or client devices) and/or one or more servers (e.g., network servers or cloud servers). In some instances, various aspects of the data management engine 104, the retention engine 106, and the interface engine 108 may be implemented in one or more computing systems and/or devices. The environment 100 may also include one or more data stores 130 accessible to the computing system 102. In general, a data store may be any device in which data can be stored and from which data can be retrieved. The data stores 130 may be accessible to the computing system 102 either directly or over a network 150. In some embodiments, the data stores 130 can store data that can be accessed by the data management engine 104 to provide the various features described herein. For example, as mentioned, the data stores 130 can store object data in which information describing objects is stored and accessible. Further, the environment 100 may include one or more data sources 132 accessible to the computing system 102. In general, a data source may be any device in which data can be stored and from which data can be retrieved. In some embodiments, these data sources 132 can store data that is represented by objects in the object data stored in the data store 130. Similarly, the data sources 132 may be accessible to the computing system 102 either directly or over the network 150. The network 150 may be any wired or wireless network through which data can be sent and received (e.g., the Internet, local area network, etc.).

The retention engine 106 can be configured to manage retention of various object data. In some embodiments, the retention engine 106 can be configured to manage object data based on one or more data retention configurations. In some embodiments, these data retention configurations may be applied to objects accessible through the data stores 130. In some embodiments, the data retention configurations may also be applied to data that is represented by these objects. As mentioned, such data may be stored and accessed through data sources 132. For example, each object can be associated with various components (e.g., properties) as defined by an object-based data model. An object can, therefore, represent data that remains stored and accessible through a given data source 132. In one example, a data source may correspond to a text file (e.g., a CSV file) that includes rows of values separated by commas. In this example, an object may be created to represent a row of values and properties of the object can each correspond to a comma separated value in the row.

In various embodiments, the retention engine 106 can periodically determine respective states for objects being managed. These states may be determined based on any data retention configurations being applied. For example, data represented by objects (e.g., data stored on data sources 132) may be subject to some regulation that requires the data to be deleted after some period of time. In this example, the retention engine 106 can periodically determine whether to take action against the objects and/or the data represented by the objects in view of the regulation. For example, the retention engine 106 may schedule the data represented by the objects for deletion (e.g., a hard delete). This data can then be deleted from any data sources in which the data resides (e.g., data sources 132). In another example, an object state can be used to specify an approval status for actions to be performed on the object. In this example, the approval status can indicate whether actions to be performed on the object were approved by some authorized user (or administrator). In some embodiments, object state is an example of metadata. In general, any conventional approach for deleting (or purging) data may be used to delete data residing in data sources (e.g., deleting files, scrubbing database tables, etc.). Similarly, the retention engine 106 can schedule objects for deletion (e.g., a soft delete). In general, any specified action (or operation) may be applied to objects and/or to data represented by the objects. In some embodiments, one set of actions may be applied to the objects and a different set of actions may be applied to data represented by the objects. More details describing the retention engine 106 will be provided below in reference to FIG. 2.

The interface engine 108 can be configured to generate and provide an interface (e.g., graphical user interface) through which various information can be accessed and visualized. For example, the interface can be provided by a software application (e.g., data analytics application, web browser, etc.) running on a computing device 120 and through a display screen of the computing device 120. The interface can provide users with the ability to access information corresponding to objects being managed by the retention engine 106. For example, a user operating the computing device 120 can interact with the interface to access information describing various objects or sets of objects (e.g., objects related to some project or case). In one example, the interface can identify objects and/or associated metadata that are scheduled for some action (e.g., deletion of an object, deletion of data represented by the object, etc.). The information provided through the interface can vary depending on the implementation. For example, in some embodiments, the information can include a list of objects (e.g., object name, object identifier, object type, etc.), respective actions to be performed with respect to those objects, respective dates on which those actions will be performed (e.g., a date on which the actions will be performed, a date on which the actions must be performed to satisfy legal requirements, etc.), corresponding projects (or cases) to which the objects are related, a respective number of links between each object and one or more other objects, and a respective number of properties associated with each object, to name some examples. In some embodiments, the information presented through the interface can vary depending on a user's access rights. For example, the interface may only provide information corresponding to a portion of a set of objects that a user (or administrator) is authorized to access. In some embodiments, the interface engine 108 can provide options for modifying object retention schedules and/or actions to be performed on objects. In some embodiments, the interface can provide options for modifying retention information for existing objects (e.g., different actions to be performed on objects, dates, related projects or cases, etc.). In some embodiments, the interface can provide options for scheduling new objects for retention (e.g., options to specify actions to be performed on objects, dates, related projects or cases, etc.). More details describing interfaces provided by the interface engine 108 will be provided below in reference to FIGS. 3A-3D.

In general, the approaches described herein may also be implemented in computing environments that do not model data from data sources using an object model. In some embodiments, the data management engine 104 may operate as a centralized data management service that provides endpoints (e.g., application programming interfaces) for performing various operations on data. For example, the data management engine 104 may provide one endpoint for specifying criteria for identifying data, an endpoint for identifying data that meets the specified criteria, another endpoint for scheduling various actions to be performed on the identified data, and another endpoint for requesting actions to be performed on the identified data. Naturally, many variations are possible.

Figure 2:
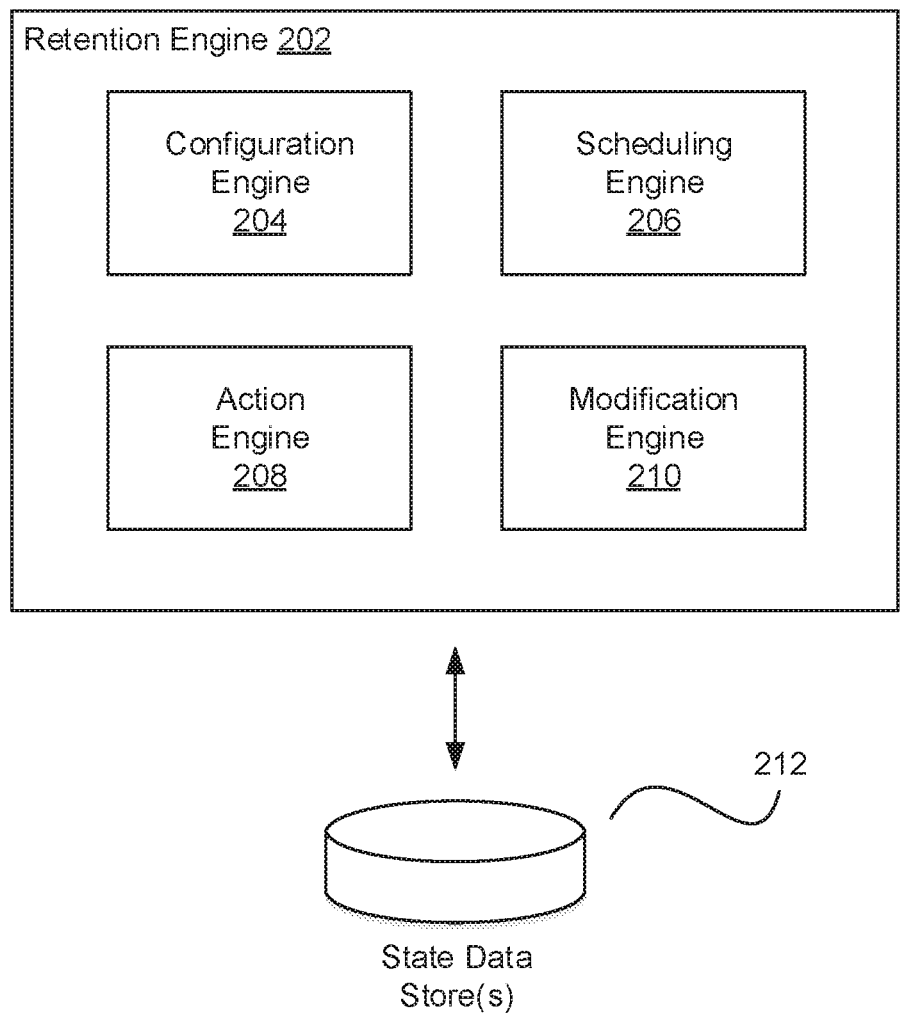
FIG. 2 illustrates an example retention engine, in accordance with various embodiments.

FIG. 2 illustrates an example retention engine 202, in accordance with various embodiments. The retention engine 202 may be implemented as the retention engine 106 of FIG. 1. In some embodiments, the retention engine 202 includes a configuration engine 204, a scheduling engine 206, an action engine 208, and a modification engine 210. The retention engine 202 can also interact with a state data store 212. The state data store 212 may be accessible to the retention engine 202 either directly or over a network. In some embodiments, the state data store 212 can store information describing object states. For example, in some embodiments, object states can be determined for all objects in a given database. These object states and related metadata can be stored in the state data store 212. Subsequently, these object states can be recomputed periodically (e.g., hourly, daily, etc.) for all objects in the database that were created, deleted, or modified and these recomputed states can also be stored in the state data store 212.

The configuration engine 204 can be configured to create and manage data retention configurations. In some embodiments, the configuration engine 204 can determine object states based on data retention configurations. For example, in some embodiments, the configuration engine 204 can be configured to manage rules associated with data retention configurations. In such embodiments, the configuration engine 204 can also be configured to compute (or process) those rules to ensure up-to-date object state management. In some embodiments, a data retention configuration implements one or more data retention policies. For example, a data retention configuration may specify criteria for identifying objects and respective actions to be performed once those objects are identified. In general, any criteria may be used to identify objects on which some action is to be taken. In some embodiments, objects can be identified based on object type. An object may be assigned a type based on the type of data being represented by the object. Thus, an object that references data corresponding to an entity (e.g., person (s), place(s), thing(s), etc.) can be an entity-type object. Similarly, an object that references data corresponding to some activity (e.g., event, incident, etc.) can be an activity-type object.

In some embodiments, objects can be identified based on one or more object properties. In general, an object may be associated with a set of properties that describe data represented by the object. For example, an object may represent a row in a database table. This row may correspond to an employee John Doe and each column value of the row may correspond to some attribute of the employee (e.g., employee name, employee id, title, etc.). In this example, an object may represent the employee John Doe and this object can be associated with a set of properties that each correspond to attributes of the employee. Thus, one property of the object may reference the employee's name, another property may reference the employee's id, and another property may reference the employee's title, for example. In another example, an object may be associated with a property that identifies a date on which data represented by the object was created and another property that identifies a date on which the data expires (or is scheduled for deletion). Such date properties can be used to manage retention of objects and data represented by those objects, for example.

In some embodiments, objects can be identified based on their relationships to other objects. As mentioned, in some embodiments, relationships between objects can be represented using corresponding edges (or links). In some instances, these object relationships can be used to identify additional related objects on which actions can be performed. For example, a set of objects may relate to a project (or case). In this example, the configuration engine 204 can be instructed to perform some action on all objects that relate to the project. Here, the configuration engine 204 can use existing object relationships to identify such objects and can instruct the action engine 208 to perform the requested action(s). In some embodiments, edge distance can be used to identify related objects that may otherwise not be identified using some specified criteria. For example, the criteria may specify that objects corresponding to a first case be scheduled for deletion (or some other action). The criteria may also specify that any other objects linked to objects corresponding to the first case with an edge distance of two also be deleted. Here, a first object corresponding to the first case may be linked to a second object that corresponds to a second case. Further, the second object may be linked to a third object corresponding to a third case. In this example, the first object, the second object, and the third object can all be scheduled for deletion in view of the specified criteria.

In some embodiments, a data retention configuration can granularly define which actions to perform on object data. For example, in some embodiments, a data retention configuration can be created so that one set of actions are performed on objects satisfying some criteria while a different set of actions are performed on data represented by those objects. In one example, a data retention configuration may specify that objects satisfying some criteria be made inaccessible while data represented by those objects be permanently deleted from its corresponding data sources. In various embodiments, information corresponding to data retention configurations is stored and updated in the state data store 212. Naturally, many variations are possible.

The scheduling engine 206 can be configured to determine respective states for objects or sets of objects (e.g., objects related to some project or case) being managed by the retention engine 202. In various embodiments, the scheduling engine 206 determines these object states based on one or more data retention configurations provided by the configuration engine 204. In some embodiments, the scheduling engine 206 can be configured to run at pre-defined time intervals (e.g., every 24 hours, every week, etc.). When run, the scheduling engine 206 can evaluate each of the objects being managed for compliance with any data retention configurations that are applicable to those objects. For example, a data retention configuration may indicate that objects having a specified property should be deleted (or scheduled for deletion) after a specified time. In this example, the scheduling engine 206 can identify objects that satisfy this criterion. These identified objects can then be flagged (or marked) for further processing by the action engine 208, as described below. In some embodiments, the scheduling engine 206 ensures that the configuration engine 204 and the action engine 208 are run at appropriate intervals (pre-defined or otherwise). The scheduling engine 206 also helps surface various information to the configuration engine 204 and the action engine 208 such as which objects to process.

The action engine 208 can be configured to perform actions specified in data retention configurations. As mentioned, a data retention configuration may specify criteria for identifying objects and respective actions to be performed once those objects are identified. In some embodiments, the action engine 208 can determine objects that were flagged (or marked) by the scheduling engine 206 in view of a data retention configuration. The action engine 208 can also determine respective actions to be performed on the flagged objects as specified by the data retention configuration. The action engine 208 can then perform the corresponding actions with respect to the flagged objects.

In general, the action engine 208 can be configured to perform any action(s) specified in a data retention configuration. For example, in some embodiments, a data retention configuration may specify that objects satisfying some criteria be deleted or made inaccessible (e.g., a soft deletion). In such embodiments, the action engine 208 can delete (or make inaccessible) the objects satisfying the criteria. In some embodiments, a data retention configuration may specify that data represented by objects satisfying some criteria be deleted from their corresponding data sources. In such embodiments, the action engine 208 can delete (or make inaccessible) data represented by objects satisfying the criteria from corresponding data sources. In some embodiments, a data retention configuration may specify that one or more notifications be sent to one or more users (or administrators) before any actions are performed on objects that satisfy some criteria. In such embodiments, the action engine 208 can send those notifications to the appropriate users (or administrators) before performing the actions. Such notifications may be sent using conventional approaches for electronically communicating information. In some embodiments, a data retention configuration may require pre-approval from authorized users (or administrators) before any actions are performed. In such embodiments, the action engine 208 can request such approval by the authorized users (or administrators) before performing those actions, as described in reference to FIGS. 3A-3D.

In some instances, there may be exceptions for not performing actions specified in data retention configurations. For example, an object (or data represented by the object) may need to be deleted within some specified time period in order to comply with a data retention configuration. However, there may be a valid reason not to perform that action. For example, there may be a legal justification for extending a scheduled deletion date for the object (or data represented by the object). To allow for such flexibility, the modification engine 210 can be configured to determine a list of justifications that may be used to change (or modify) actions to be performed on objects or data represented by those objects. In some embodiments, a user (or administrator) can select justifications from this list to modify which actions are performed on object data. These justifications may also be used to modify dates on which scheduled actions will be performed on object data. Once a justification for modifying an action and/or action date with respect to a given object is provided, the modification engine 210 can perform the operations needed to implement the requested modifications. In some embodiments, the modification engine 210 can generate audit logs that document such modifications. For example, an audit log may identify which object data was affected by the modification, the respective modifications made (e.g., modified actions, extended retention dates, etc.) to the object data, and any justifications being applied to support those modifications. In some embodiments, the modification engine 210 can provide such justifications for use through an interface as described below in reference to FIGS. 3A-3D. In some embodiments, the modification engine 210 also triggers the configuration engine 204 to recompute (or update) the state of the object(s) being modified. The recomputing helps ensures up-to-date states and that the configuration engine 204 houses the source of truth for how the retention state of objects are determined.

Figure 3A:
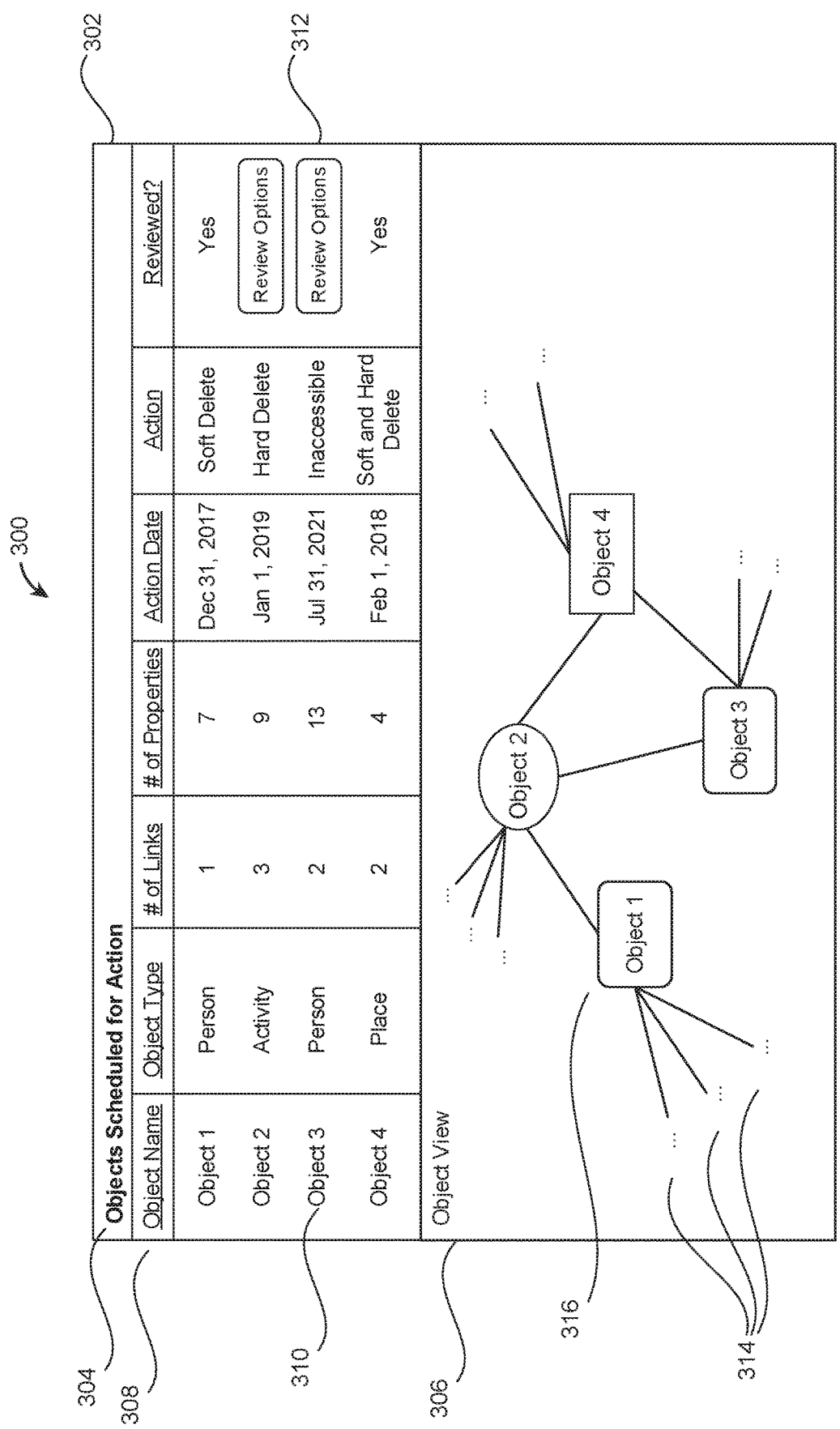
FIGS. 3A-3D illustrate example interfaces, in accordance with various embodiments.
Figure 3B:
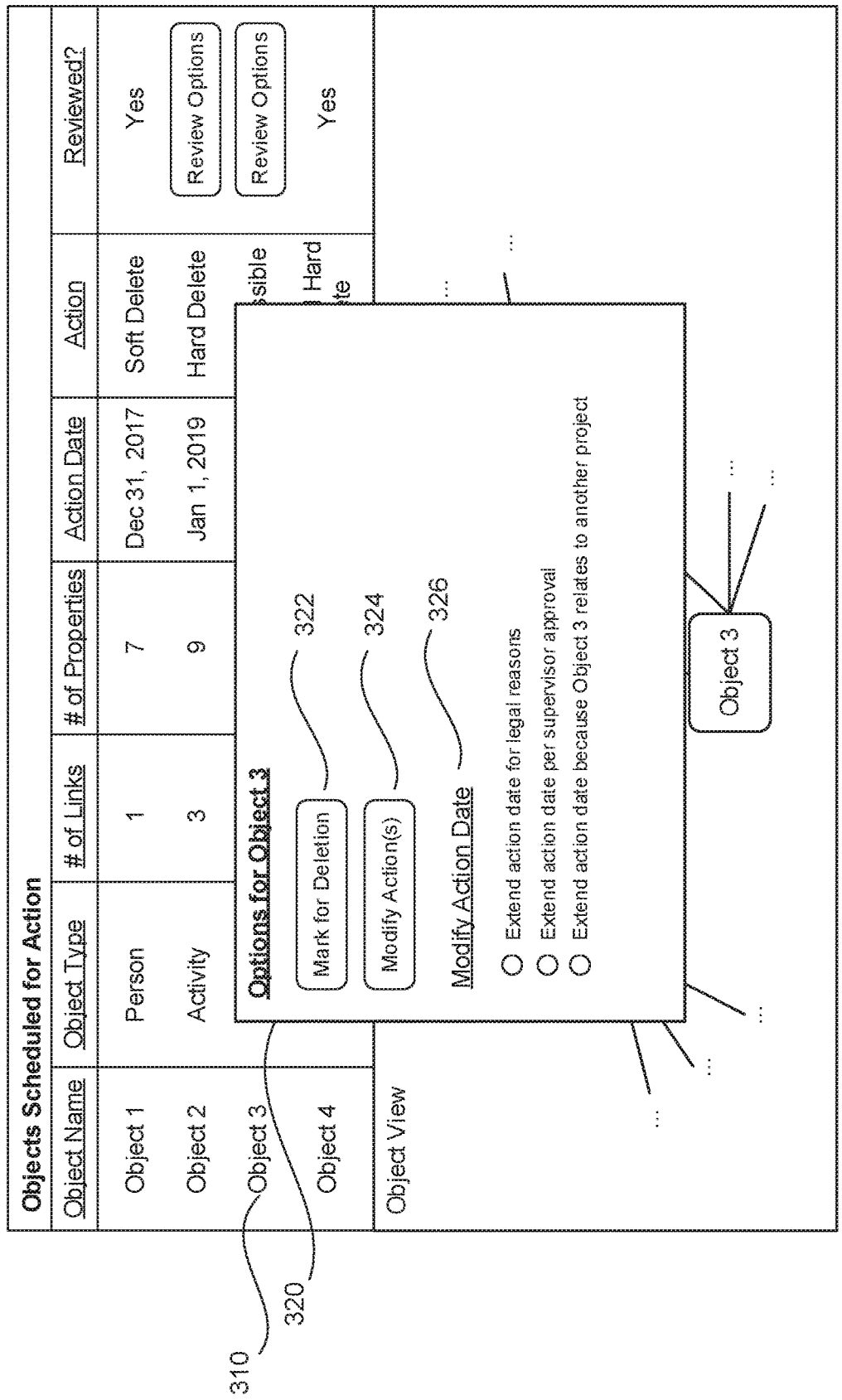

FIG. 3A illustrates an example 300 of an interface 302 through which object information can be accessed. In general, some, or all, of the features described in reference to FIGS. 3A-3D can be implemented and provided by the interface engine 108 of FIG. 1. In various embodiments, the interface 302 may be accessed through a software application (e.g., data analytics application, web browser, etc.) running on a computing device. In some embodiments, the interface 302 includes a first region 304 through which information describing objects can be accessed. In this example, the first region 304 includes a list of objects that are scheduled for some action (e.g., soft deletion, hard deletion, being made inaccessible, etc.). In some embodiments, the list of objects provided in the first region 304 can be organized based on a set of attributes 308. These attributes can include object name, object type (e.g., entity, activity, etc.), a number of links between the object and other objects, a number of properties associated with the object, a date on which an action (or actions) are scheduled for the object, the scheduled action(s), a review status for the object, metadata associated with the object, and conflict flags associated with the object, to name some examples. Naturally, many variations are possible. In some embodiments, the interface 302 includes a search bar that allows users to search for objects and view information related to those objects (e.g., object retention states). In some embodiments, a review status for an object indicates whether the actions to be performed on the object were reviewed and approved by some authorized user (or administrator). In some embodiments, authorized users can access additional review options for a given object 310 by selecting a corresponding review option 312. Once selected, the interface 302 can provide additional options for the object 310, as illustrated in the example of FIG. 3B. In some embodiments, the interface 302 includes a second region 306 through which object relationships can be visualized. In some embodiments, a user operating the computing device can interact directly with objects through the second region 306. For example, the user can access other objects 314 that are linked to a given object 316. The user may also specify actions to be taken against the related objects 314, when those actions should be taken, or whether existing actions scheduled for those objects 314 should be modified, for example.

FIG. 3B illustrates an example set of options 320 corresponding to the object 310. In this example, the set of options 320 includes an option 322 for marking (or flagging) the object 310 for some action (e.g., deletion), an option 324 for modifying the scheduled action, and options (or justifications) 326 for modifying any action(s) and/or dates scheduled for the object 310. In some embodiments, information describing selected modifications is outputted into one or more audit logs.

Figure 3C:
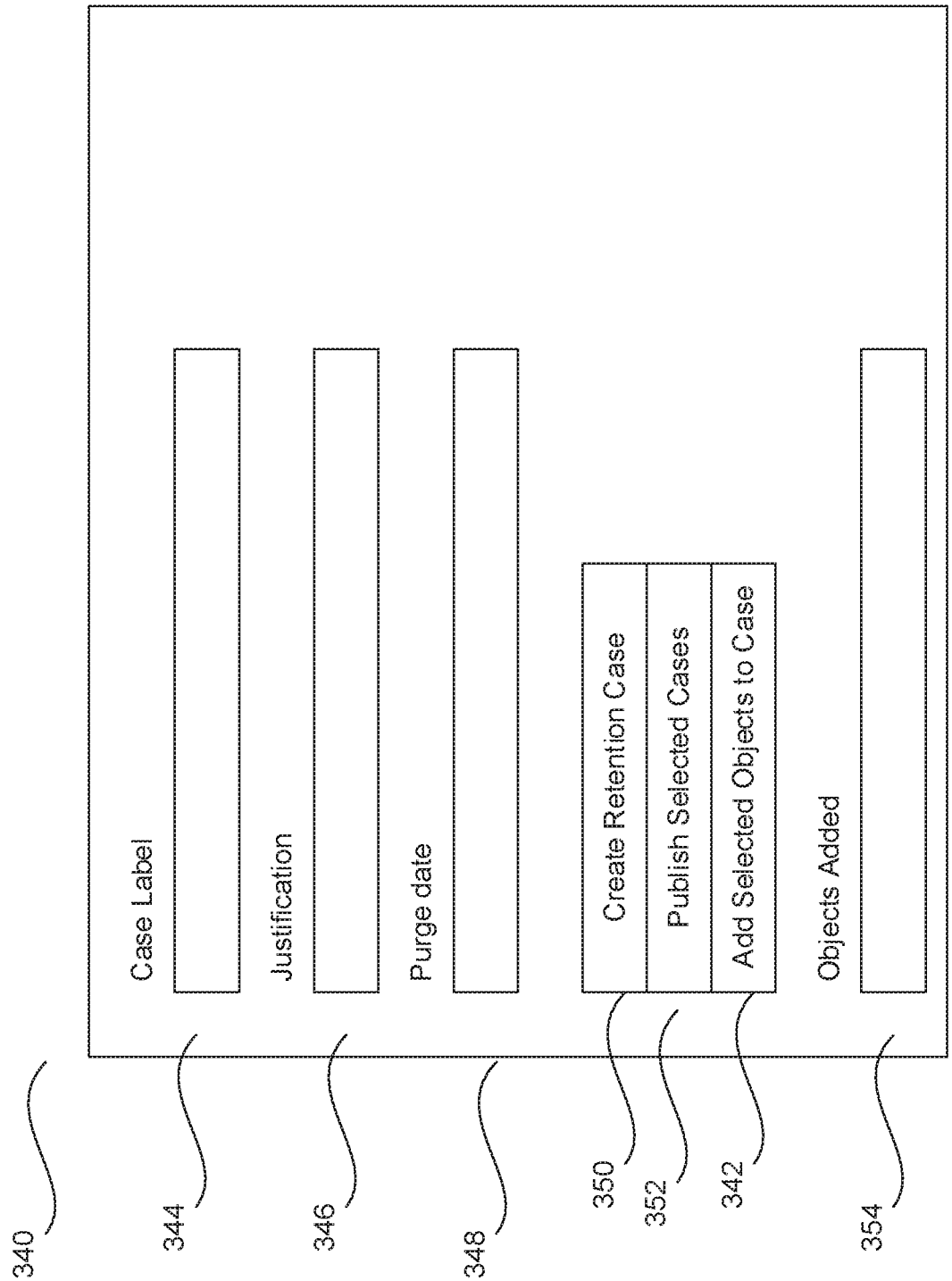

FIG. 3C illustrates an example interface 340 for creating retention policies. In this example, a user can add relevant objects using the "Add Selected Objects To Case" button 342. The user can fill in details on the desired Case Label 344 title for the Retention Case (or policy), as well as accompanying justification 346 and purge date 348. In some embodiments, these are required fields. When ready, the user can click "Create Retention Case" button 350 to create a Retention Case which will be linked to all the objects. In some embodiments, the user has the option to delete the Retention Case and start over. Once ready, the user can select the "Publish Selected Cases" button 352 to queue them up for deletion. The interface 340 can include a region 354 in which information describing objects (e.g., object titles) can be shown when those objects are added to the Retention Case (or policy).

Figure 3D:
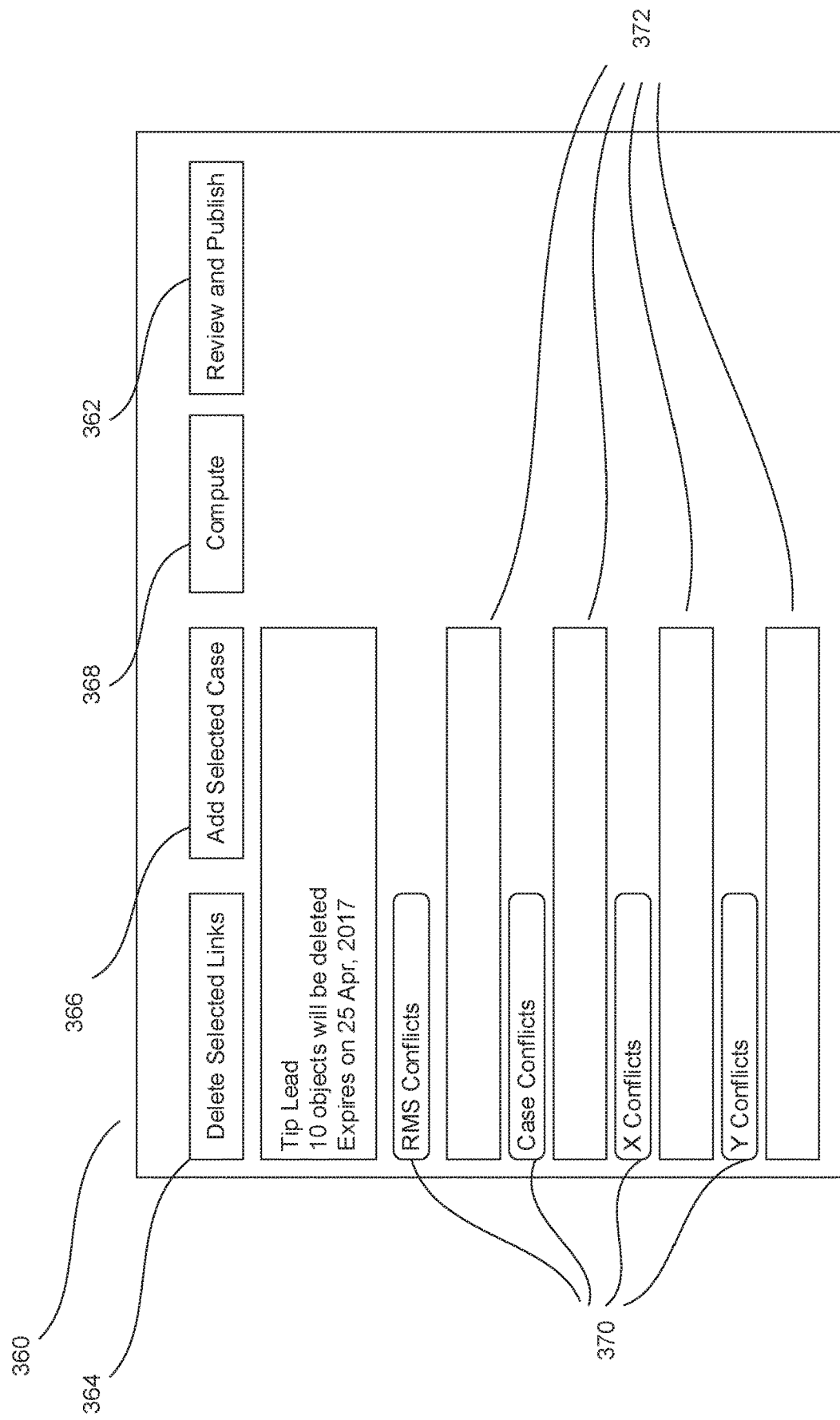

FIG. 3D illustrates an example interface 360 for editing retention policies (or cases). The interface 360 allows users to edit and recompute what is being deleted. In some embodiments, any changes made are not implemented until the user selects the "Review and Publish" button 362. In some embodiments, the "Delete Selected Links" button 364 can be used to select one or more links and delete them. In some embodiments, the deletion results in deleting the actual link between the objects in addition to removing them from the graph. In some embodiments, the user needs write access on the link in order for this deletion to be successful. In some embodiments, the user is presented with an error message if link deletion fails. In some embodiments, the "Add Selected Case" button 366 can be used to select a case to be edited. In some embodiments, the user needs to select exactly one object of the appropriate retention object type. In some embodiments, the user is presented with an error message if the object fails to be added. In some embodiments, the "Compute" button 368 can be selected to compute a new web of linked objects and see what objects are slated to be deleted for the selected case. In some embodiments, all objects directly and indirectly linked to a case will be subject to this computation. In some embodiments, the "Review and Publish" button 362 can be selected to publish all changes and mark the case as approved. In some embodiments, selecting "Review and Publish" 362 results in rerunning the "Compute" function 368 and checks what to delete based on the current mapping of the objects. In some embodiments, one or more conflict flag buttons 370 can be selected to select all objects that are associated with those flags. The interface 360 can include one or more regions 372 in which information describing objects (e.g., object titles) and corresponding flags can be shown.

Figure 4:
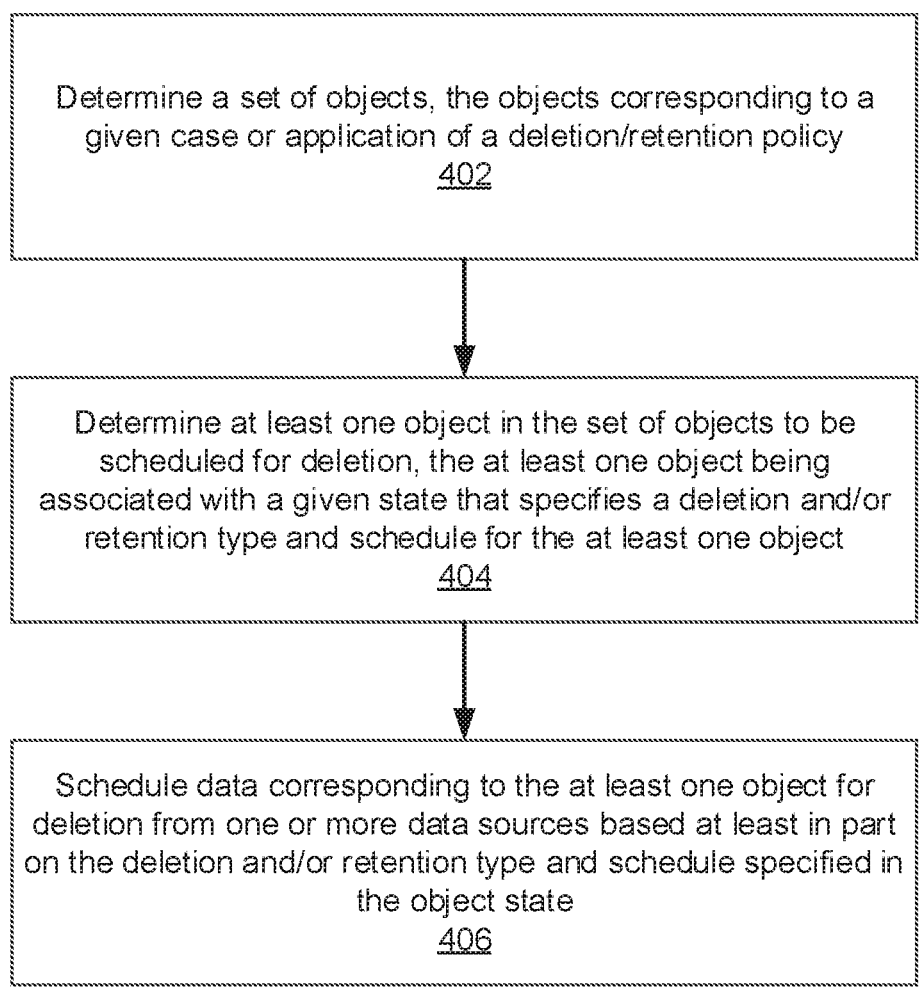
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a set of objects is determined, the objects corresponding to a given case or application of a deletion/retention policy. In general, objects corresponding to a case can be of various types. For example, these objects may be entity objects (e.g., person objects), activity objects, and media objects, to name some examples. At block 404, a determination is made that at least one object in the set of objects is scheduled for deletion, the at least one object being associated with a given state that specifies a deletion and/or retention type and schedule for the at least one object. At block 406, data corresponding to the at least one object is scheduled for deletion from one or more data sources based at least in part on the deletion and/or retention type and schedule specified in the object state. In some embodiments, object states can be modified by associating the object with a new state that is subsequently processed based on the new state.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, Vx Works, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
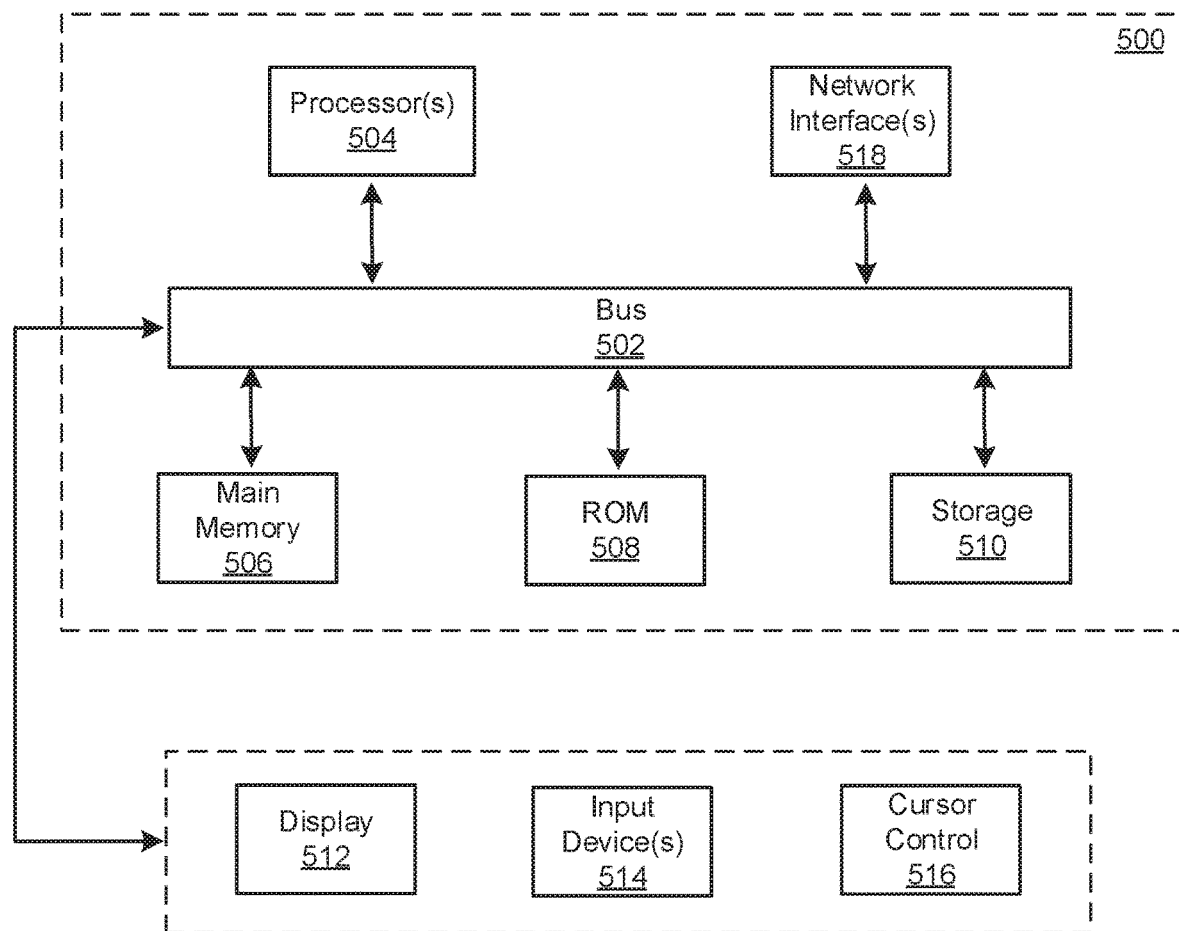
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine." "system," "data store." and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
   one or more processors; and
   a memory storing instructions that, when executed by the one or more processors, cause the system to perform:
   providing one or more application programming interface (API) endpoints to receive criteria for identifying data scheduled for deletion or retention, identify objects or corresponding data that meets the criteria, schedule actions to be performed on the objects or the corresponding data, and receive requests for actions to be performed on the objects or the corresponding data, wherein the objects comprise one or more containers for the corresponding data;
   responsive to one or more changes regarding states associated with the objects or inputs regarding the states:
   based on first logic that applies first actions to a subset of the objects that satisfy a first criteria related to the states, determining the first actions to be performed on a subset of the objects based on the states associated with the subset of the objects;
   based on second logic that applies second actions to a subset of data corresponding to the subset of the objects, determining the second actions to be performed on the subset of the data, wherein the second actions are different from the first actions, the second actions specifying a deletion and a manner or a type of the deletion, or a retention and a manner or a type of the retention, wherein the first logic and the second logic granularly or separately manage retention or deletion of the objects and the corresponding data; and
   performing the first actions and the second actions.

2. The system of claim 1, wherein the instructions that, when executed by the one or more processors, cause the system to perform:
   displaying, on an interface, the objects and organizing the objects according to attributes associated with the objects, wherein the attributes include at least two of:
   data object names;
   data object types;
   a number of links between the set of data objects;
   a number of properties associated with the set of data objects;
   dates on which actions are scheduled to be performed;
   scheduled actions;
   review status of the set of data objects, and
   conflict flags associated with the set of data objects.

3. The system of claim 1, wherein the states are determined based on any two of:
   a type of an object of the objects;
   a number of links between the object and other objects of the objects;
   metadata associated with the object; and
   a conflict flag associated with the object; and the instructions further cause the system to perform:
   identifying data, in an audit log, affected by the modification to the object.

4. The system of claim 1, wherein the instructions further cause the system to perform:
   modifying a state of an object of the objects based on any two of:
   a type of the object;
   a number of links between the object and other objects of the objects;
   metadata associated with the object; and
   a conflict flag associated with the object; and
   identifying data, in an audit log, affected by the modification to the object.

5. The system of claim 4, wherein the instructions further cause the system to perform:
   determining to reclassify the object based on the modification to the state to enforce deletion of the object despite a restoration of the object; and
   determining to delete the object and data associated with the object based on the reclassification of the object.

6. The system of claim 1, wherein the instructions further cause the system to perform:
   identifying an additional object to be scheduled for the same action as an object of the subset of the objects, based on an edge distance of a link between the additional object and the object; and
modifying the given state of the object based on any two of:
a type of the object;
a number of links between the object and the additional object;
metadata associated with the object; and
a conflict flag associated with the object; and
identifying data, in an audit log, affected by the modification to the given state of the object.

7. The system of claim 1, wherein the instructions further cause the system to perform:
determining to reclassify an object of the subset of the objects based on a change to a state to enforce deletion of the object despite a restoration of the object; and
determining to delete the object and data associated with the object based on the reclassification of the object.

8. A computer-implemented method, the method comprising:
providing one or more application programming interface (API) endpoints to receive criteria for identifying data scheduled for deletion or retention, identify objects or corresponding data that meets the criteria, schedule actions to be performed on the objects or the corresponding data, and receive requests for actions to be performed on the objects or the corresponding data, wherein the objects comprise one or more containers for the corresponding data;
responsive to one or more changes regarding states associated with the objects or inputs regarding the states:
based on first logic that applies first actions to a subset of the objects that satisfy a first criteria related to the states, determining the first actions to be performed on a subset of the objects based on the states associated with the subset of the objects;
based on second logic that applies second actions to a subset of data corresponding to the subset of the objects, determining the second actions to be performed on the subset of the data, wherein the second actions are different from the first actions, the second actions specifying a deletion and a manner or a type of the deletion, or a retention and a manner or a type of the retention, wherein the first logic and the second logic granularly or separately manage retention or deletion of the objects and the corresponding data; and
performing the first actions and the second actions.

9. The computer-implemented method of claim 8, further comprising:
displaying, on an interface, the objects and organizing the objects according to attributes associated with the objects, wherein the attributes include at least two of:
data object names;
data object types;
a number of links between the set of data objects;
a number of properties associated with the set of data objects;
dates on which actions are scheduled to be performed;
scheduled actions;
review status of the set of data objects, and
conflict flags associated with the set of data objects.

10. The computer-implemented method of claim 8, wherein the states are determined based on any two of:
a type of an object of the objects;
a number of links between the object and other objects of the objects;
metadata associated with the object; and
a conflict flag associated with the object; and the instructions further cause the system to perform:
identifying data, in an audit log, affected by the modification to the object.

11. The computer-implemented method of claim 8, further comprising:
modifying a state of an object of the objects based on any two of:
a type of the object;
a number of links between the object and other objects of the objects;
metadata associated with the object; and
a conflict flag associated with the object; and
identifying data, in an audit log, affected by the modification to the object.

12. The computer-implemented method of claim 11, further comprising:
determining to reclassify the object based on the modification to the state to enforce deletion of the object despite a restoration of the object; and
determining to delete the object and data associated with the object based on the reclassification of the object.

13. The computer-implemented method of claim 8, further comprising:
identifying an additional object to be scheduled for the same action as an object of the subset of the objects, based on an edge distance of a link between the additional object and the object; and
modifying the given state of the object based on any two of:
a type of the object;
a number of links between the object and the additional object;
metadata associated with the object; and
a conflict flag associated with the object; and
identifying data, in an audit log, affected by the modification to the given state of the object.

14. The computer-implemented method of claim 8, further comprising:
determining to reclassify an object of the subset of the objects based on a change to a state to enforce deletion of the object despite a restoration of the object; and
determining to delete the object and data associated with the object based on the reclassification of the object.

15. A non-transitory computer readable medium comprising instructions that, when executed, cause one or more processors to perform:
providing one or more application programming interface (API) endpoints to receive criteria for identifying data scheduled for deletion or retention, identify objects or corresponding data that meets the criteria, schedule actions to be performed on the objects or the corresponding data, and receive requests for actions to be performed on the objects or the corresponding data, wherein the objects comprise one or more containers for the corresponding data;
responsive to one or more changes regarding states associated with the objects or inputs regarding the states:
based on first logic that applies first actions to a subset of the objects that satisfy a first criteria related to the states, determining the first actions to be performed on a subset of the objects based on the states associated with the subset of the objects;
based on second logic that applies second actions to a subset of data corresponding to the subset of the objects, determining the second actions to be performed on the subset of the data, wherein the second actions are different from the first actions, the second actions specifying a deletion and a manner or a type of the deletion, or a retention and a manner or a type of the retention, wherein the first logic and the second logic granularly or separately manage retention or deletion of the objects and the corresponding-data; and performing the first actions and the second actions.

16. The non-transitory computer readable medium of claim 15, wherein the instructions that, when executed, cause the one or more processors to perform:
displaying, on an interface, the objects and organizing the objects according to attributes associated with the objects, wherein the attributes include at least two of:
data object names;
data object types;
a number of links between the set of data objects;
a number of properties associated with the set of data objects;
dates on which actions are scheduled to be performed;
scheduled actions;
review status of the set of data objects, and
conflict flags associated with the set of data objects.

17. The non-transitory computer readable medium of claim 15, wherein the states are determined based on any two of:
a type of an object of the objects;
a number of links between the object and other objects of the objects;
metadata associated with the object; and
a conflict flag associated with the object; and the instructions further cause the system to perform:
identifying data, in an audit log, affected by the modification to the object.

18. The non-transitory computer readable medium of claim 15, wherein the instructions further cause the one or more processors to perform:
modifying a state of an object of the objects based on any two of:
a type of the object;
a number of links between the object and other objects of the objects;
metadata associated with the object; and
a conflict flag associated with the object; and
identifying data, in an audit log, affected by the modification to the object.

19. The non-transitory computer readable medium of claim 18, wherein the instructions further cause the one or more processors to perform:
determining to reclassify the object based on the modification to the state to enforce deletion of the object despite a restoration of the object; and
determining to delete the object and data associated with the object based on the reclassification of the object.

20. The non-transitory computer readable medium of claim 15, wherein the instructions further cause the one or more processors to perform:
identifying an additional object to be scheduled for the same action as an object of the subset of the objects, based on an edge distance of a link between the additional object and the object; and
modifying the given state of the object based on any two of:
a type of the object;
a number of links between the object and the additional object;
metadata associated with the object; and
a conflict flag associated with the object; and
identifying data, in an audit log, affected by the modification to the given state of the object.

* * * * *